INVENTORS
WILLIAM M. DERR
BILL J. HARPER

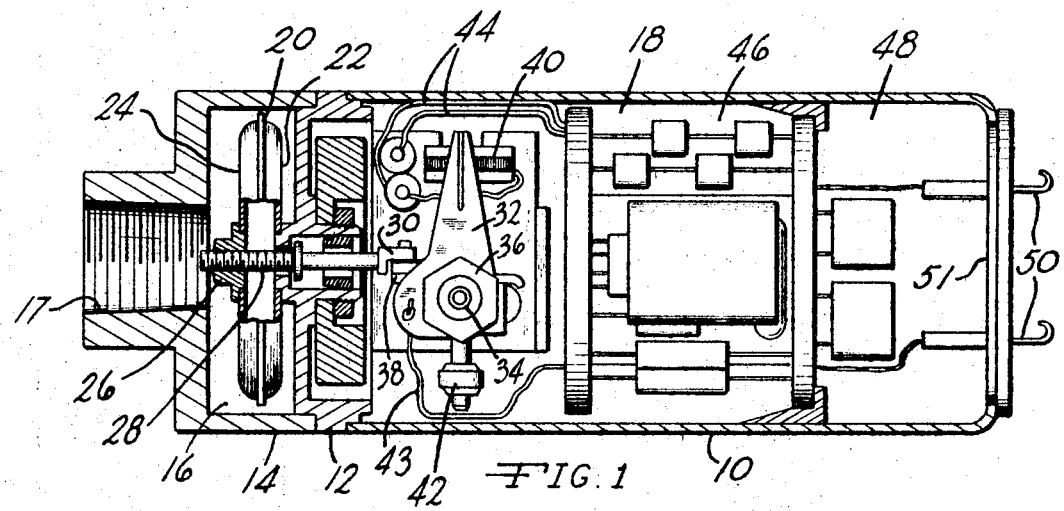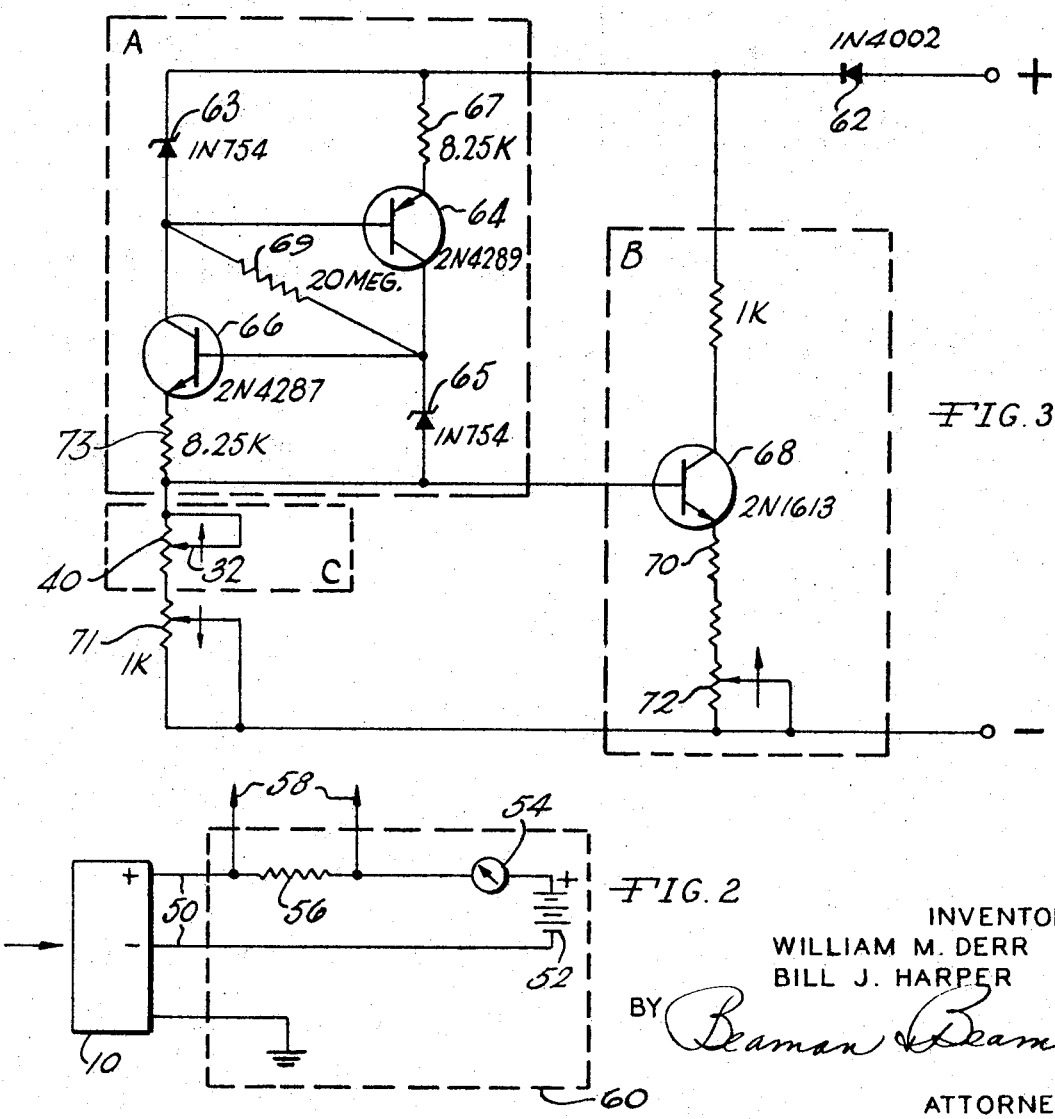

BY *Beaman & Beaman*

ATTORNEYS

United States Patent Office 3,545,274
Patented Dec. 8, 1970

3,545,274
SEA WATER DEPTH TRANSDUCER AND SYSTEM
William M. Derr and Bill J. Harper, Albuquerque, N. Mex., assignors to Sparton Corporation, Jackson, Mich., a corporation of Ohio
Filed Oct. 3, 1968, Ser. No. 764,737
Int. Cl. G01l 9/02
U.S. Cl. 73—393                          4 Claims

ABSTRACT OF THE DISCLOSURE

A sea water depth transducer and system for use in determining underwater pressures and pressure fluctuations, particularly suitable for use in geological explorations wherein calibration and inaccuracies due to conductor loss is minimized as current, rather than voltage, is sensed as regulated by a transducer potentiometer resistance element. A current amplifier, and temperature compensation means are incorporated in the circuitry, along with readout apparatus in the form of a current sensing gauge. The current output to resistance curve is maintained substantially linear by relating the tap of the potentiometer to its resistance coil in a unique manner to compensate for the usual nonlinearity of the current to resistance relationship.

BACKGROUND OF THE INVENTION

The invention pertains to the field of fluid pressure sensing and telemetry wherein a resistance coil is employed, and current fluctuations are used to actuate the sensing and indicating apparatus.

In underwater geological exploration, such as is widely practiced along the shorelines of the world in the search for oil bearing formations, it is common practice to conduct such explorations by producing a pressure wave by an explosion, or the like, which is reflected by earth formations below the water body which are sensed by apparatus capable of interpreting variations in the reflected pressure patterns. The most common practice consists of towing an array of hydrophones or transducers behind a vessel which periodically produces a high density and magnitude pressure wave, such as by an explosion, wherein the reflected pressure waves can be imposed upon the transducers and sensed thereby. The arrays towed behind the exploratory vessels are often several thousand feet in length, necessitating very long electrical conductors from the transducers to the readout and indicating equipment located on the vessel.

With arrays of considerable length, as in the usual practice, calibration of the transducers becomes difficult in that the length of the electrical conductor between the transducer and the sensing and readout apparatus produces a significant voltage reduction, and it is necessary that the components of an array be oriented in a predetermined manner in order to obtain a consistency of array performance and sensitivity.

In that it is often the practice to disassemble an array, and reassemble, or add or subtract sections thereto, calibration of the array can be very troublesome and time consuming. Furthermore, in that calibration is often accomplished on the exploratory vessel, yet the skilled personnel and equipment to accomplish this calibration may not be readily available, inaccuracies in calibration often exist, which would not be present if the equipment could be calibrated under more desirable circumstances.

SUMMARY OF THE INVENTION

It is an object of the invention to provide a sea water depth transducer and system utilizing current variation, rather than voltage variations, to sense sea water depth and pressures located therein such that line losses are minimized, and wherein calibration problems are substantially eliminated, regardless of the length of the array in which the transducers are normally used.

Additionally, it is a purpose of the invention to produce an underwater depth transducer and system arrangement which is capable of automatically compensating for temperature variations such that consistent operating characteristics may be produced within a considerable temperature range.

In the practice of the invention a transducer is employed having a deformable diaphragm, one side of which is exposed to the ambient water pressure, and the other side is maintained under predetermined pressure conditions, preferably by a pressurized inert gas located within the body or casing of the transducer.

The transducer includes a potentiometer consisting of a cylindrical resistance coil engaged by a tap pivotally supported within the transducer. The tap is mechanically connected to the diaphragm such that movement of the diaphragm under pressure variations rotatably displaces the tap on the resistance coil. However, the current variation in a uniformly spirally wound coil does not vary in a linear manner as the resistance is changed. Thus, without a compensating means to account for such nonlinearity an accurate reading and indication of the pressure existing at the transducer is not possible.

In accord with the invention the nonlinear relationship between current output and resistance is compensated for by relating the resistance coil to the axis of the tap, and the "zero" point of the sensing device such that movement of the tap from its zero location results in a variable change in resistance for each unit of angular tap movement. The pivot location of the tap is fixed, and in the practice of the invention the resistance coil is of a cylindrical linear configuration, and it is so related to the pivot axis that angular movement of the tap due to an increase in transducer ambient pressure increases the radial location of the point of contact between the tap and coil producing an automatic increase in the linear displacement of the tap on the coil for each degree of angular tap rotation. The relationship between the coil tap and tap axis is such as to compensate for the usual nonlinear current-resistance relationship to result in a substantially linear current variation through the resistance coil as the transducer ambient pressure varies in a linear manner.

Additionally, an inert pressurized gas is maintained within the transducer casing communicating with the side of the diaphragm opposed to the side exposed to the ambient pressure such that increases in the ambient temperature increases the pressure within the transducer acting upon the diaphragm to automatically compensate for temperature differences and thereby maintain a consistency of readout over a given temperature range.

In that the current variations produced in the transducer resistance coil due to variations in the ambient pressure are very small, a current amplifier is employed in the circuitry to provide sufficient current to effectively operate the indicating and readout apparatus. Additionally, electrical components are used in the circuitry to also aid in temperature compensation.

BRIEF DESCRIPTION OF THE DRAWING

FIG. 1 is a diametrical, sectional view of a transducer constructed in accord with the invention, FIG. 2 is a schematic diagram of a single transducer and circuit arrangement in accord with the invention, FIG. 3 is a circuit diagram employed with the transducer, portions of the circuit being incorporated in blocks for purpose of illustration.

DESCRIPTION OF THE PREFERRED EMBODIMENT

Figure 5:
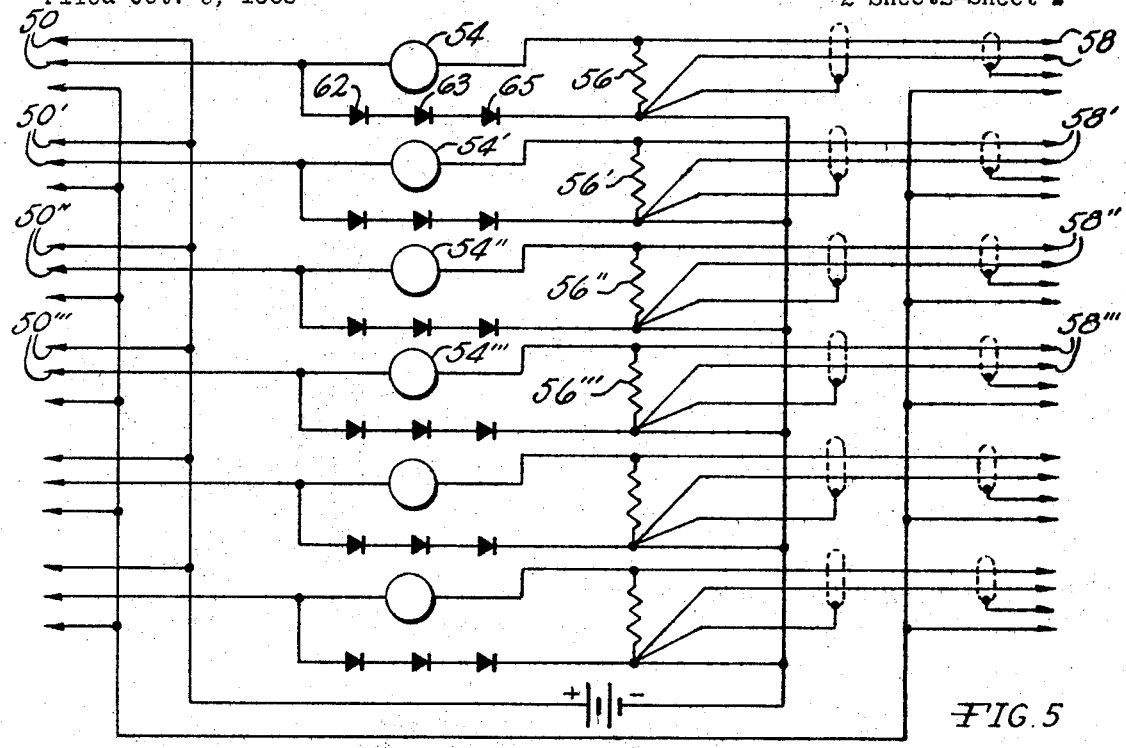
FIG. 5 is a diagram of a simplified electric circuit employed in a six transducer system.

The transducer preferably employed with the invention is illustrated in section in FIG. 1, and preferably, this transducer is of a cylindrical configuration having a primary casing 10. A partition 12 is affixed to the left end of the casing 10, and the end portion 14 of the transducer is affixed to the partition 12 wherein the components 10, 12 and 14 combine to form the exterior appearance of the transducer. The portion 14 forms a chamber 16, which is subjected to the transducer ambient pressure through a port 17. The interior of the casing portion 10 constitutes a chamber 18 in which the circuitry and operating mechanism of the transducer is located, as will be later described.

The pressure sensing element of the transducer is preferably in the form of a bellows type device 20 of a hollow configuration being defined by diaphragm members 22 and 24. The diaphragm 22 is centrally provided with an orifice and is affixed to the partition 12 which forms the mounting for the bellows 20. The diaphragm 24 includes opposite sides and supports a central fitted hub element 26 into which the actuating shaft or rod 28 is adjustably threaded. The rod 28 extends through a central opening formed in the partition 12 such that the inner end 30 thereof is located within the chamber 18 and the interior of the pressure sensing device 20 communicates with the chamber 18 through the openings provided for rod 28.

The rod end 30 is affixed to a potentiometer tap arm 32 by means of a flexible leaf-type connection 38, and the tap 32 is pivotally mounted within the chamber 18 as to be oscillatable about a pivot axis 34. A nut 36 maintains and connects the tap 32 to the transducer pivot structure.

An electric resistant coil 40, which is preferably of the cylindrical, uniformly spirally wound type is engaged by the tap arm 32, and it will therefore be appreciated that longitudinal movement of the rod 28 will result in a translating of the tap arm 32 across the resistant coil 40. This motion is balanced by a counterbalance 42 affixed to the tap arm 32.

Electrical conductor 43 is connected to the tap 32, and electrical conductors 44 are connected to the resistant coil 40. The conductors 43 and 44 are connected to the electrical circuitry, later described, located within chamber 46.

The right end of the transducer casing 10 is sealed by a cap member 51 through which the terminals 50 extend.

FIG. 2 is a schematic drawing of a single channel arrangement of the invention, and the basic interconnection of transducer associated components will be appreciated from this figure. The transducer casing 10 is grounded and the transducer is immersed in a fluid body, such as sea water, wherein the ambient pressure will be imposed upon the diaphragm 24 as the fluid enters the chamber 16 through the opening 17. This ambient pressure is indicated by the arrow in FIG. 2.

The "back" pressure within the chamber 18 is created by the presence of an inert gas, such as nitrogen, and the pressure within chamber 18 will be less than that of the fluid pressures surrounding the transducer. According to the magnitude of the fluid pressure, which is dependent upon the depth of the transducer, the diaphragm 24 will be pushed to the right to a location representing that particular fluid pressure. This axial movement of the rod 28 will produce an angular movement of the tap arm 32 locating the tap upon the coil 40 to provide a particular electrical resistance through the coil. This resistance will affect the current flowing through the transducer as supplied by the battery or direct current source 52, and the current sensitive ammeter 54 will give an indication of the current flowing through the circuitry, including the coil 40, and thereby provide a reading proportional to the pressure being imposed in the transducer. It is often desired that the transducer output be fed into a storing and computing apparatus, and analog output terminals 58 are provided for this purpose having the current sensing resistor 56 interposed therebetween. In a commercial embodiment of the invention the resistor 56 is 100 ohms.

Figure 4:
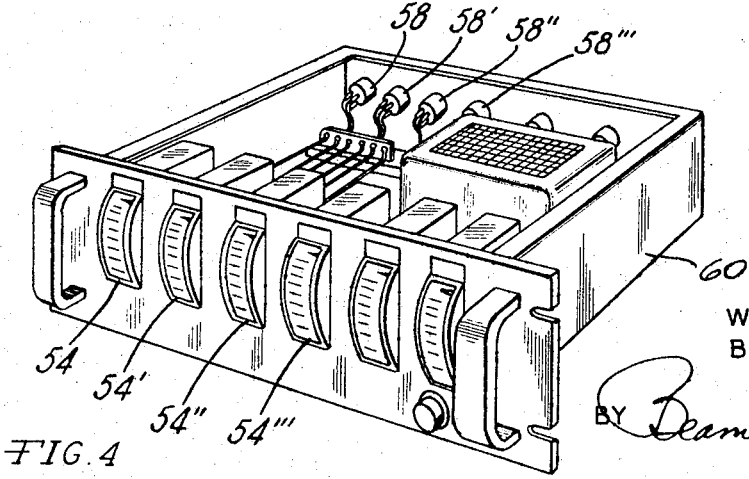
FIG. 4 is a perspective view of the readout cabinet and apparatus used in conjunction with a six channel transducer array in accord with the invention.

In an array used in underwater geological exploration a plurality of transducers will be employed in each array, and the necessary apparatus for a complete array may be housed within a cabinet 60, FIG. 4, which provides the necessary housing for a six channel apparatus employing six transducers. A typical circuitry which would be employed in the housing 60 for six transducers is shown in FIG. 5, and the similarity of each of these individual circuits to that shown in FIG. 2 will be appreciated.

The terminals 58 associated with the analog apparatus will be sensitive to the voltage of the circuit and this voltage is obtained from the current sensing resistor 56.

Figure 7:
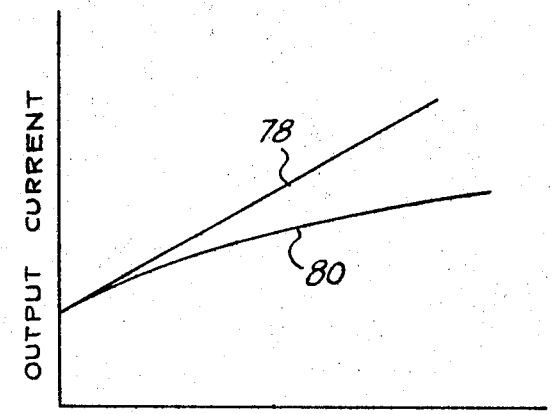
FIG. 7 is a graph representing the relationship between output current and resistance, which is compensated for by the apparatus of the invention.

When using apparatus of this type employing current variations to indicate a fluid pressure wherein a potentiometer functions to change the current characteristics, electrical problems are encountered which must be compensated for by either mechanical or electrical means. With reference to FIG. 7, a graph is shown illustrating the relationship between output current and program resistance. It will be noted from this graph that as the current and resistance are increased that a monotonically decreasing slope occurs as the resistance increases in value. This slope is indicated by the line 80, as compared with the desired linear ratio line 78. The output has a non-zero value for a zero program resistance and for this reason the lines 78 and 80 begin at a current reading at no resistance. This electrical characteristic causes no problem as the readout instruments, such as ammeter 54, can be readily calibrated with a zero offset either by zero suppression and/or a scale offset.

The curve of the slope 80 is approximately 1½% and is sufficiently serious to affect the accuracy of the apparatus.

Figure 6:
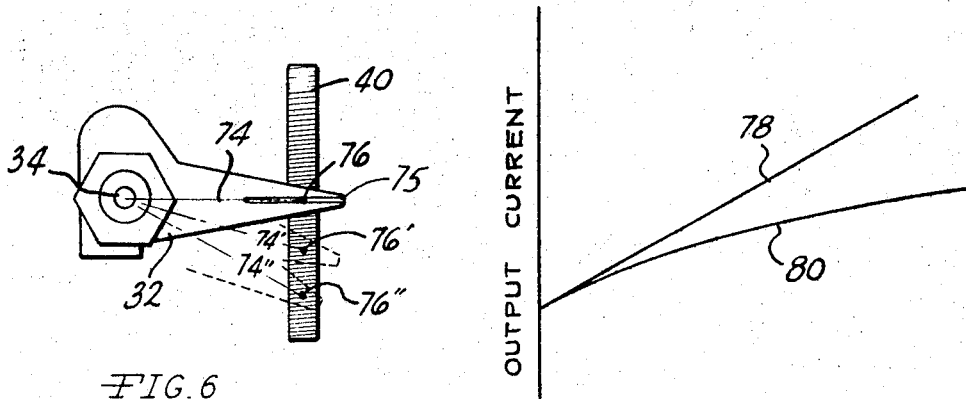
FIG. 6 is an enlarged, schematic diagram indicating the relationship of the tap and resistance coil in accord with the invention.

The aforementioned nonlinearity of the current to resistance curve is compensated for in the invention by relating the point of minimum resistance of the operating range to the location of the resistance coil 40, to the tap pivot 34 and the tap arm 32 in a predetermined manner, which is best illustrated in FIG. 6.

The coil 40 is of a cylindrical linear type having a longitudinally extending axis. The line 74 represents the radial distance between the tap axis 34 and the point of engagement 76 between the tap arm 32 and the coil 40. A point engagement exists between the tap and coil in that the tap is indented in a V-shaped manner at 75 toward the coil, and this configuration extends in a radial direction as is apparent. In the position illustrated in full lines, FIG. 6, the resistance is at zero, and the transducer will be at its "zero" reading indicating no depth or deflection of the diaphragm 24. At this location the radial distance 74 will be at its operational minimum.

As the ambient pressure upon the transducer diaphragm 24 increases the tap arm 32 is moved in a clockwise direction, FIG. 6, which causes the tap arm 32 to move across the coil 40 to the dotted line positions illustrated. At an intermediate portion during the operating range the engagement point 76' between arm 32 and 40 occurs, and it will be appreciated that the radial distance 74′ will be greater than that of 74 due to the tangental relationship of the axis of the coil 40 to the circular movement of the tap arm 32. The maximum operating range resistance location is represented by the point 76″, at which position the radial distance 74″ will be the greatest. As the radial distance between the point of contact of the tap 32 and the coil 40 uniformly increases as the tap arm 32 is rotated this increase results in a uniform variation of the distance the tap arm 32 moves along the coil 40 for each degree of rotation of the tap arm. Thus, a nonlinear varying relationship is produced which is opposite to that of the curve 78, resulting in a substantially linear current variation as the transducer operates through its range. Thus, with the two wire system illustrated it is possible to obtain a uniform current output variation indicative and accurately representing the pressure imposed upon the diaphragm 24.

The circuitry encased in the transducer case 10 can be described as consisting of three parts, A, B and C, which are indicated in blocks in FIG. 3. Portion A consists of a constant current regulator, portion B is a current amplifier, and portion C is the program resistor or the pressure proportional resistance.

The portion A of the circuit constituting the constant current regulator includes a complimentary pair of NPN-PNP transistors 64 and 66 with equal base voltage references, Zener diodes 63 and 65 and resistances 67 and 69. Thus, the magnitude of the constant current is represented as follows:

$$I_R = \frac{V_{63} - V_{BE64}}{R_{67}} \left(\frac{B_1}{B_1+1}\right) + \frac{V_{65} - V_{BE66}}{R_{69}} \left(\frac{B_2}{B_2+1}\right)$$

where:

$V_{63}$ is the voltage of Zener diode 63.
$V_{65}$ is the voltage of Zener diode 65.
$V_{BE64}$ is the base emitter voltage of 64.
$V_{BE66}$ is the base emitter voltage of 66.
$B_1$ is Beta of 64.
$B_2$ is Beta of 66.

Resistor 69 will insure a starting of the circuit if low leakage transistors are used.

The constant current, as produced by circuit portion A, divides between the current amplifier portion B and the pressure proportional resistance portion C. The current division is determined by the input resistance of the current amplifier and the resistance of the pressure proportional resistance path.

The current amplifier portion B includes transistor 68 whose collector current is controlled by its base current. The collector current is proportional to pressure on the transducer, which is represented by the pressure proportional resistance $R_{40}$, and is given by:

$$I_{C3} = \frac{I_R R_{PT} - V_{BE68}}{\left(\frac{B_3+1}{B_3}\right) R_E + \left(\frac{1}{B_3}\right) R_{PT}}$$

where:

$I_R$ is the reference current produced by circuit portion A.
$R_{PT}$ is $R_{40} + R_{71}$ which is the sum of the pressure proportional resistance and the zero adjust resistor.
$V_{BE68}$ is the base emitter voltage of 68.
$B_3$ is Beta of 68.
$R_E$ is the total emitter resistance of 68.

The portion of the circuit in part C, $C_{40}$, may have a pressure proportional resistance of a range of approximately 5,000 ohms for the total pressure range desired. A non-zero end value of approximately 100 ohms is needed for temperature compensation of the apparatus.

The total current flow through the circuit into the positive terminal is the sum of the reference current $I_R$ as established by portion A of the circuit and the collector current $I_{C3}$ of the current amplifier of part B. Thus, the total current can be represented as:

$$I_{total} = I_R + I_{C3}$$
$$= R_{PT} \left(2 \frac{(V_R - V_B)}{R R_E}\right) + 2 \left(\frac{V_R - V_B}{R}\right) - \frac{V_B}{R_E}$$

where:

$R_{67} = R_{73} = R$
$V_{63} = V_{65} = V_R$
$V_{BE64} = V_{BE66} = V_{BE68} = V_B$
$B_1 \gg 1$
$B_2 \gg 1$
$B_3 \gg 1$

Since $R_{PT}$ is the sum of the resistance in the programs leads $R_{PT} = R_{40} + R_{71}$ and the total current is $$I_{total} = R_{40} \left(\frac{2(V_R - V_B)}{R R_E}\right) + \frac{2(R_{71} + R_E)(V_R - V_B) - R V_B}{R R_E}$$

As shown by the latest equation the current flow through the circuit is directly proportional to the pressure proportional resistance $R_{40}$, with a zero offset. The zero and full scale values of current are determined by zero adjust resistance 71 and $R_E$, respectively.

The diode 62 is added to the circuit for reverse polarity protection, and the device cannot be damaged by the application of voltage with the wrong polarity.

The circuit may be temperature compensated over a limited range by the addition of a positive temperature coefficient silicon resistor 70 in the emitter lead of transistor 68. The addition of this resistor will compensate for the positive span shift with increasing temperature encountered with the circuit and span adjustment can be accomplished through variable resistance 72.

Since a positive zero shift with increasing temperature is also a characteristic of this type of circuit this zero shift can be compensated for by decreasing the program resistance with increasing temperature. This compensation is produced by the introduction of the inert pressurized gas into the transducer chamber 18 as described above.

It will therefore be appreciated that the ambient pressure surrounding the transducer 10 may be readily sensed and indicated, and a system may be produced wherein calibration, accuracy and sensitivity are not affected by line losses between the transducer and the readout apparatus. Additionally, field calibration is eliminated and as the electrical output is a current proportional to transducer ambient pressure relatively simple indicating and readout instruments may be employed.

It is appreciated that various modifications to the disclosed embodiment may be apparent to those skilled in the art without departing from the spirit and scope thereof.

What is claimed is:

1. An underwater pressure sensing transducer system utilizing electrical current output and sensing to minimize calibration requirements and conductor loss comprising, in combination, a pressure sensitive transducer having a variable electrical resistor member sensing the transducer ambient pressure, a constant electrical current supply source connected to said resistor member, a current amplifier connected to said constant current supply source, the supplied current being divided between said resistor member and said amplifier, pressure sensitive means associated with said member providing substantially linear current characteristics within the operating range of said member controlling the ratio of said constant current supply source divided between said resistor member and said amplifier, and current indicating means connected to said constant current supply source and said amplifier whereby the current output of said transducer member and said amplifier is sensed and indicated by said indicating means.

2. In a transducer system as in claim 1 wherein said electrical resistor member includes a deformable diaphragm having first and second sides, said first side communicating with the transducer ambient pressure, an electrical resistor coil, a pivotally mounted tap engaging said coil, means connecting said tap to said diaphragm whereby movement of said diaphragm varies the electrical resistance of said coil, and a predetermined pressure communicating with said diaphragm second side created by a gas having predetermined thermal expansion characteristics whereby increase of the transducer ambient temperature increases the pressure of said gas and the pressure acting upon said diaphragm second side compensating for temperature variations.

3. In a transducer system as in claim 1 wherein said resistor member includes a uniformly wound coil having a linear axis and a tap having an elongated radial arm pivotal about a fixed axis engaging said coil at a varying arm radial location in accord with the angular position of the tap with respect to said fixed axis as determined by the ambient pressure, said coil and tap being oriented such that the length of said arm and coil axis are substantially perpendicularly disposed wherein said radial location is at substantially its minimum distance from the tap pivot axis at one end of the range of the current indicating means and said radial location increases as said transducer senses pressure variation for the opposite end of the operating and current sensing range and said coil axis being radially spaced from said arm fixed axis a distance such that the increase in linear movement of the location of engagement of said tap and coil for each unit of angular rotation of said tap arm compensates for the reciprocal resistance-current relationship to provide substantially linear curent characteristics for said resistor member.

4. In a transducer system as in claim 1, a casing, said transducer, constant electrical current supply source, means producing substantially linear current characteristics and said current amplifier being located within said casing, and a two conductor output interconnecting said constant current source amplifier and said current indicating means.

References Cited

UNITED STATES PATENTS

| | | | |
|---|---|---|---|
| 2,890,411 | 6/1959 | Whittaker et al. | 73—398X |
| 3,136,968 | 6/1964 | Kramer | 338—41 |
| 3,136,969 | 6/1964 | Mollick | 338—41 |
| 3,173,120 | 3/1965 | Marks et al. | 338—41X |

LOUIS R. PRINCE, Primary Examiner

J. W. ROSKOS, Assistant Examiner

U.S. Cl. X.R.

73—398; 338—41